(12) United States Patent
Oda

(10) Patent No.: US 8,733,810 B2
(45) Date of Patent: May 27, 2014

(54) TAKING OUT ROBOT SYSTEM USING ROLLER DEVICE

(71) Applicant: Fanuc Corporation, Yamanashi (JP)

(72) Inventor: Masaru Oda, Yamanashi (JP)

(73) Assignee: Fanuc Corporation, Minamitsuru-Gun, Yamanashi (JP)

(*) Notice: Subject to any disclaimer, the term of this patent is extended or adjusted under 35 U.S.C. 154(b) by 0 days.

(21) Appl. No.: 13/947,371

(22) Filed: Jul. 22, 2013

(65) Prior Publication Data

US 2014/0028040 A1 Jan. 30, 2014

(30) Foreign Application Priority Data

Jul. 26, 2012 (JP) ................................. 2012-165591

(51) Int. Cl.
*B66C 1/42* (2006.01)
(52) U.S. Cl.
USPC ....... 294/86.4; 700/259; 414/730; 414/749.1; 901/31; 294/907
(58) Field of Classification Search
USPC .............. 294/86.4, 213, 106, 902, 907; 623/60–61, 64; 901/30, 31, 39; 700/245, 250, 259; 382/153; 414/589, 414/591, 730, 744.1, 749.1, 754, 403–407, 414/409
See application file for complete search history.

(56) References Cited

U.S. PATENT DOCUMENTS

| | | | | |
|---|---|---|---|---|
| 4,669,940 A | * | 6/1987 | Englehardt et al. | 414/303 |
| 5,026,104 A | * | 6/1991 | Pickrell | 294/86.4 |
| 5,092,731 A | * | 3/1992 | Jones et al. | 414/406 |
| 5,769,592 A | * | 6/1998 | Christenson | 414/408 |
| 2004/0186624 A1 | | 9/2004 | Oda et al. | |

FOREIGN PATENT DOCUMENTS

| | | |
|---|---|---|
| JP | 2004230513 A | 8/2004 |
| JP | 2005317854 A | 11/2005 |

* cited by examiner

*Primary Examiner* — Stephen Vu
(74) *Attorney, Agent, or Firm* — Lowe Hauptman & Ham, LLP

(57) ABSTRACT

A robot system capable of purposely withdrawing a workpiece into a hand, and capable of sequentially and effectively taking out the workpiece, even when workpieces are randomly located. A hand has a base part attached to the front end of a robot arm, at least two fingers pivotally attached to base part, and a roller device arranged at a front end of each finger. The roller device is a rotating belt device having a small motor arranged in the finger, a driving roller driven by the motor via a drive transmitting means, and a driven roller rotated with the driving roller via a belt.

11 Claims, 9 Drawing Sheets

(a)  (b)  (c)  (d)

TAKING OUT ROBOT SYSTEM USING ROLLER DEVICE

RELATED APPLICATIONS

The present application is based on, and claims priority from, Japanese Application Number 2012-165591, filed Jul. 26, 2012, the disclosure of which is hereby incorporated by reference herein in its entirety.

BACKGROUND OF THE INVENTION

1. Field of the Invention

The present invention relates to a robot system which takes out an object by using a robot, wherein a roller device is arranged on a finger of a hand of the robot.

2. Description of the Related Art

In the prior art, there is a known robot having a camera for detecting an object to be take out and a grip-type hand. For example, Japanese Unexamined Patent Publication (Kokai) No. 2004-230513 discloses a work taking out robot wherein a hand having a gripping means and sensor head are attached to a front end of a robot arm, and the posture of the hand is properly changed based on an image of the workpiece obtained by the sensor head.

Further, Japanese Unexamined Patent Publication (Kokai) No. 2005-317854 discloses a transfer robot having a hand for holding a plate-like workpiece in a horizontal state, wherein a plurality of rollers and a rotational driving mechanism for rotating the rollers are arranged to the hand so as to convey the workpiece in the horizontal direction.

In the device of Japanese Unexamined Patent Publication (Kokai) No. 2004-230513, the posture of the hand is properly changed so as to grip the workpiece to be taken out, corresponding to the posture of the workpiece or an overlapping state of the workpieces. However, the device does not have a function for purposely introducing the workpiece within the hand. Therefore, when the workpieces are adjacent to each other, another workpiece adjacent to the objective workpiece may be an obstacle, whereby the objective workpiece may not be gripped.

On the other hand, in Japanese Unexamined Patent Publication (Kokai) No. 2005-317854, the hand with the roller device has a flat hand surface. Therefore, although the hand can convey workpieces which are supplied in an orderly manner, the hand cannot easily take out or convey workpieces having various shapes which are randomly located.

SUMMARY OF THE INVENTION

An object of the present invention is to provide a robot system capable of purposely withdrawing a workpiece into a hand, and capable of sequentially and effectively taking out the workpieces, even when the workpieces are randomly located.

According to the present invention, a taking out robot system having a robot configured to take out a workpiece one-by-one by using a hand attached to a front end of a robot arm of the robot, is provided, wherein the hand comprises: a base part fixed to the front end of the robot arm; a gripping part constituted by two or three fingers pivotally attached to the base part, the gripping part being capable of gripping a workpiece to be taken out within a gripping area defined by the fingers; and a roller device arranged at a front end of each finger, the roller device having a roller driven by a motor, wherein the each roller device is configured to grip the workpiece to be taken out between the opposing rollers and withdraw the gripped workpiece into the gripping area, due to forward rotation of the roller, wherein the hand further comprises a gripping part-restricting structure configured to gradually varying a distance between the two or three fingers so that a state of the gripping part can be switched between a restricted state in which the fingers are restricted so as to generate a predetermined gripping force and a released state in which the fingers are released from restriction.

In a preferred embodiment, the gripping part-restricting part has a frame member through which all of the two or three fingers extend, the frame member being configured to slide along a direction from the base part to the roller device so as to gradually vary the distance between the two or three fingers.

In a preferred embodiment, the gripping part-restricting part has an air cylinder which is positioned on the base part adjacent to an outside of each finger, and each air cylinder is configured to contact the outside of the finger and apply pressure to the finger so as to gradually vary the distance between the two or three fingers.

In a preferred embodiment, the taking out robot system further comprises: a vision sensor which detects a position and posture of each of a plurality of workpieces which are randomly located; a reference motion program which is previously taught in relation to a reference workpiece, the reference motion program including a robot motion command including a series of teaching points and a command for the hand, by which the reference workpiece is taken out by means of the hand; and a controller having a function for correcting positional information and postural information at each of the series of teaching points in the reference motion program, based on information from the vision sensor.

In a preferred embodiment, the robot system comprises a sensing device which senses that the workpiece is withdrawn into the gripping area.

The sensing device may be a photoelectric sensor which indirectly senses existence of the workpiece in the gripping area, by detecting an opening degree of the fingers. Otherwise, the sensing device may be a photoelectric sensor which directly senses existence of the workpiece in the gripping area.

In a preferred embodiment, the roller device is a rotating belt device including a motor, a driving roller which is rotatably driven by the motor, and a driven roller which is rotated with the driving roller via a belt.

In a preferred embodiment, the roller device includes a motor, and two driving rollers which are rotatably driven by the motor.

In a preferred embodiment, each of the roller devices is configured to rotate the roller in a reverse direction so that the workpiece gripped within the gripping area is released through a region between the opposing rollers.

In a preferred embodiment, the hand comprises a biasing means which inwardly biases each finger so that a distance between the fingers is equal to or shorter than a predetermined value, when the two or three fingers are in the released state.

The biasing means may be a spring which connects the fingers to each other.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
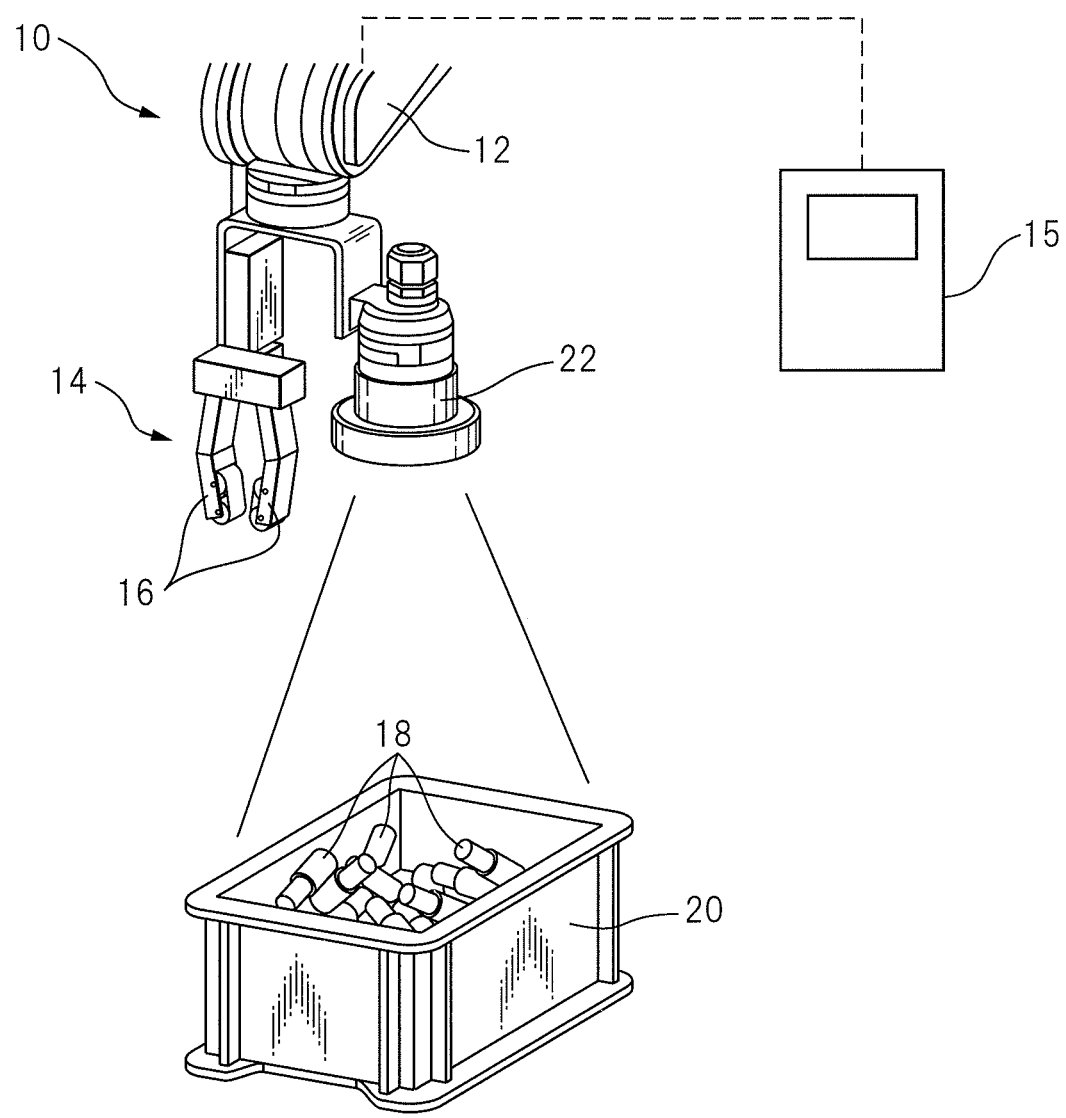
FIG. 1 is a view of an embodiment of a taking out root system according to the present invention.

FIG. 1 is a view showing major parts of a taking out robot system according to the present invention. The robot system includes a multi-joint robot 10 (for example, having a six-degree-of-freedom). Robot 10 has a robot arm 12 (partially illustrated) and a hand 14 attached to a front end of robot arm 12, wherein the position and posture of hand 14 can be arbitrarily changed based on a command from a schematically shown controller 15. Hand 14 is a grip-type hand having at least two fingers 16, and is capable of gripping a workpiece 18 to be taken out between the opposing fingers and taking out the workpiece sequentially (one-by-one in the embodiment). In the embodiment, a plurality of workpieces 18 are randomly located in a container 20, these workpieces are to be taken out one-by-one and conveyed to a predetermined place, by using hand 14.

Robot 10 has a vision sensor for detecting the position and posture of each of workpieces 18 which are randomly located. Concretely, the vision sensor has a capturing part 22 (such as a camera) configured to capture an image of workpieces 18 in container 20, and an image processor (for example, contained in controller 15) for processing the image captured by camera 22, wherein the position and posture of each workpiece 18 in container 20 can be determined by the image processing. Although camera 22 is attached to robot arm 22 in the illustrated embodiment, it is not necessary to attach camera 22 to a movable part such as the robot arm, as long as the camera can capture the image in container 20. For example, the camera may be arranged on a fixed place other than the robot.

Controller 15 of robot 10 is previously taught in relation to a reference workpiece. A reference motion program, on which a robot motion command including a series of teaching points and a command for the hand are described, is previously stored in a ROM or RAM of the controller. Controller 15 may correct positional information and postural information of each the series of teaching points, and may properly correct the robot motion command and the command for the hand.

Figure 2:
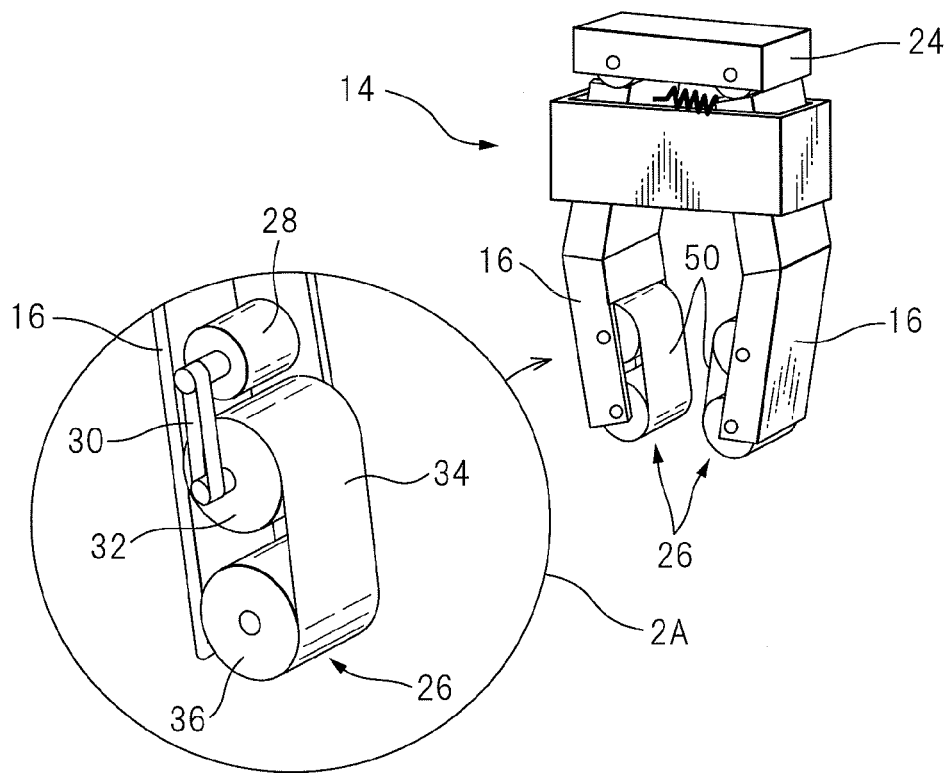
FIG. 2 is a view of an example of a robot hand of FIG. 1.

FIG. 2 is a view explaining a detailed structure of hand 14. Hand 14 has a base part 24 attached to the front end of robot arm 12, at least two (two in the embodiment) fingers (or a gripping part) 16 pivotally attached to base part 24, and a roller device 26 arranged at a front end of each finger 16. As shown in a partially enlarged view (a circle 2A) of FIG. 2, roller device 26 is a rotating belt device having a small motor 28 arranged in finger 16, a driving roller 32 driven by motor 28 via a drive transmitting means such as a pulley belt, and a driven roller 36 rotated with driving roller 32 via a belt 34 such as a flat belt or a timing belt. Rotational axes of driving roller 32 and driven roller 36 are parallel to each other, and the axes are generally perpendicular to the longitudinal direction of finger 16. Motor 28 can be rotated in the both directions, and thus the rotational directions of rollers 32 and 36 and belt 34 can be switched.

Figure 3:
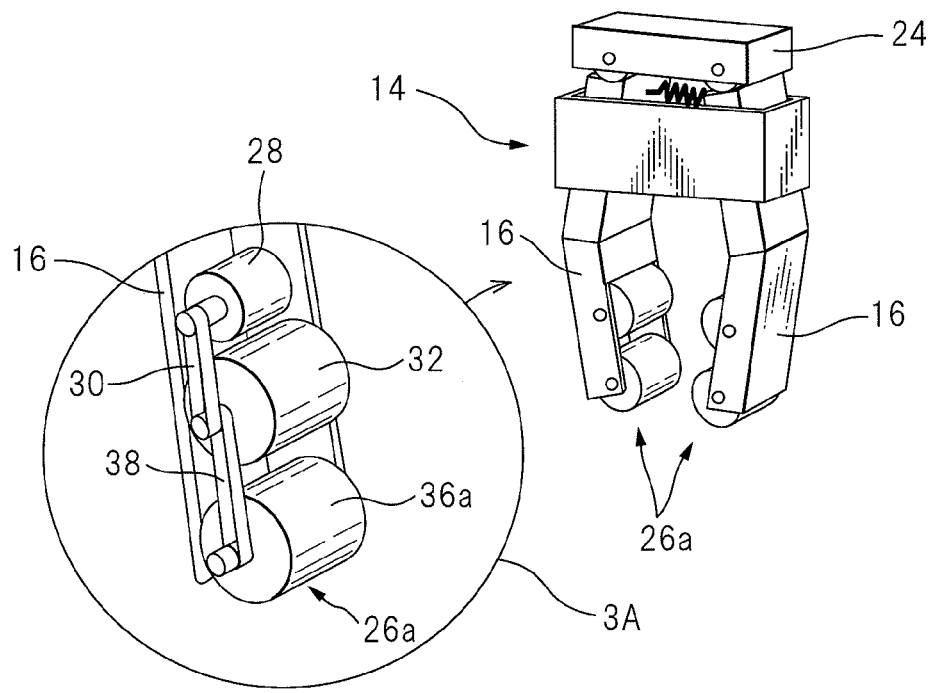
FIG. 3 is a view of another example of the robot hand.

FIG. 3 is a view explaining another example of the roller device. A roller device 26a of FIG. 3 is different from roller device 26 of FIG. 2, in that belt 34 is omitted and two driving rollers are provided. Concretely, as shown in a partially enlarged view (a circle 3A) of FIG. 3, a roller 36a at the front end of finger 16 is not a driven roller, but a driving roller which is rotatably driven by motor 28, similarly to roller 32, via a drive transmitting means 38 such as a pulley belt. Also in roller device 26a of FIG. 3, motor 28 can be rotated in the both directions, and thus the rotational directions of driving rollers 32 and 36 can be switched.

Figure 4:
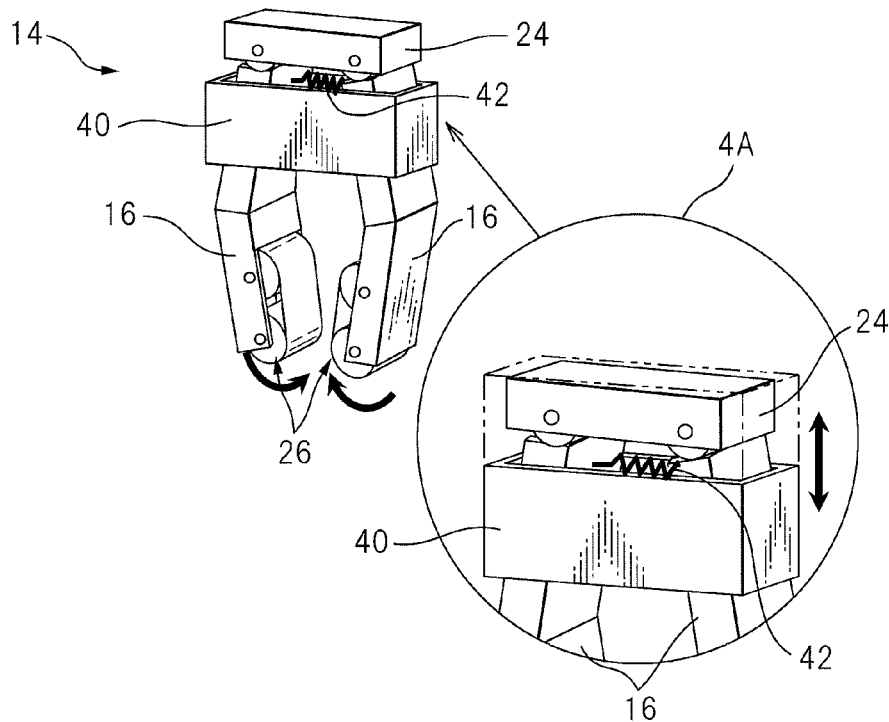
FIG. 4 is a view of a frame member which functions as a restricting structure for the hand.

FIG. 4 is a view explaining a restricting structure of the finger arranged at hand 14. Hand 14 has a frame member 40 through which all of fingers 16 extend. As shown in a partially enlarged view (a circle 4A), frame member 40 is configured to slide by means of a driving means (not shown), along a direction extending from base part 24 to roller device 26 (in the illustrated embodiment, the generally vertical direction). When frame member 40 is moved toward base part 24 (in the illustrated embodiment, when frame member 40 is moved to a position where the frame member surrounds base part 24 (as indicated by a two-dot chain line)), a pivoting range of each finger 16 is not restricted by frame member 40, and thus the griping part constituted by fingers 16 does not substantially generate gripping force. On the other hand, when frame member 40 is moved toward the front end of finger 16 (as indicated by a solid line in the enlarged view), the distance between two fingers 16 is gradually lowered, whereby the gripping force is gradually increased when the workpiece is gripped between fingers 16. As such, the gripping force generated by the gripping part can be properly adjusted due to the sliding motion of frame member 40.

As shown in FIG. 4, it is preferable that hand 14 has a biasing member 42, such as a spring, which biases fingers 16 so that the fingers approach each other. In the illustrated embodiment, portions of two fingers 16 near base part 24 are connected to each other by spring 24. When the gripping part is excessively opened (i.e., the distance between the fingers is larger than the dimension of the workpiece) during the hand approaches the workpiece in order to take out it, the workpiece may not be withdrawn even if the roller device is rotated in the forward direction, since the roller is rotated freely. However, even when frame member 40 does not limit the pivoting range of each finger 16, the distance between fingers 16 can be kept at a predetermined value or less by means of spring 42, whereby the free rotation of the roller device is avoided when the workpiece is taken out. In this regard, depending on the shape and/or the weight of the finger, the distance between the fingers may be kept at the predetermined value or less without using spring 42. In such a case, it is not necessary to use the spring.

Figure 5:
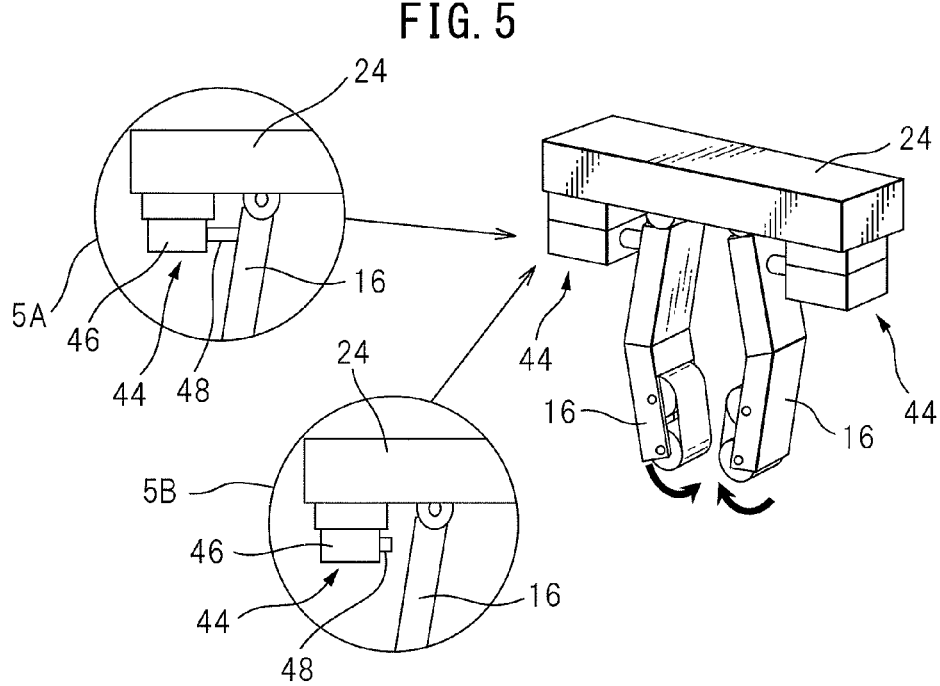
FIG. 5 is a view of an air cylinder which functions as a restricting structure for the hand.

FIG. 5 is a view explaining an alternative example of the restriction structure for the fingers. The restriction structure of FIG. 5 is an air cylinder 44 which is positioned on base part 24 adjacent to an outside of each finger 16. As shown in a partially enlarged view (a circle 5A or 5B), air cylinder 44 has a main body 46 attached to base part 24, and a piston 48 which displaceably extends from main body 46 toward finger 16. When piston 48 is retracted into main body 46 so as to not contact finger 16 (circle 5B), the pivoting range of each finger 16 is not limited by air cylinder 44, whereby the gripping part constituted by fingers 16 does not substantially generate a gripping force. On the other hand, when piston 48 protrudes from main body 46 by a predetermined distance so that the piston contacts finger 16 from outside and applies the pressure to finger 16 (circle 5A), the distance between two fingers 16 is gradually reduced, whereby the gripping force of the gripping part is gradually increased when the workpiece is gripped between fingers 16. As such, the gripping force generated by the gripping part can be properly adjusted by means of air cylinder 44. In addition, the biasing member, such as spring 42 as shown in FIG. 4, may be applied to the embodiment of FIG. 5.

Figure 6:
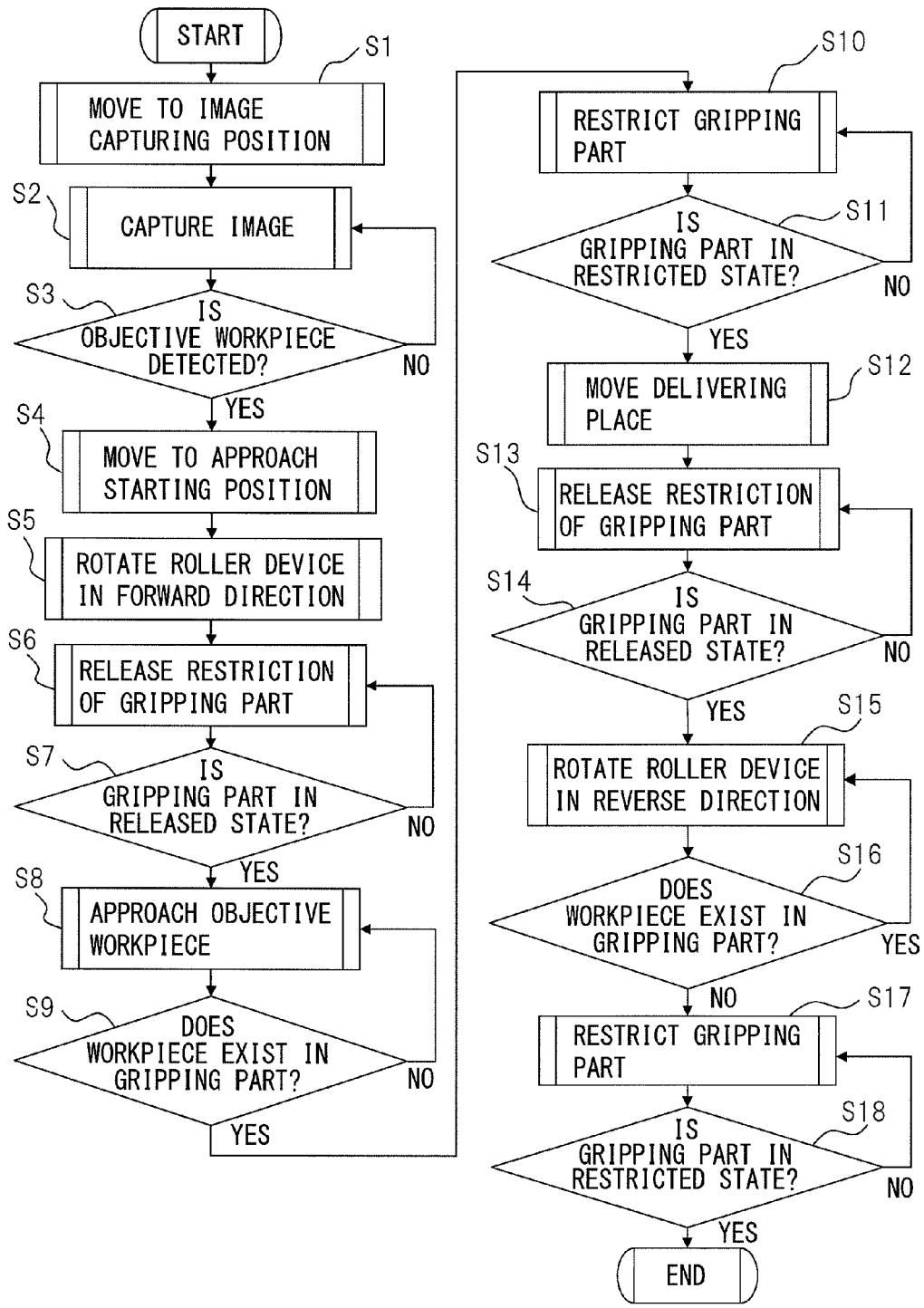
FIG. 6 is a flowchart showing a procedure for taking out a workpiece.

Hereinafter, a method for taking out the workpiece, using the taking out robot system, is explained with reference to a flowchart of FIG. 6, etc. Although the roller device and the restriction structure will be explained as the embodiment of FIGS. 2 and 4, it is obvious that these components may be similarly applied to the embodiment of FIGS. 3 and 5.

First, as shown in FIG. 1, robot 10 is operated so that camera 22 is moved to an image capturing position where the camera can capture workpieces 18 within container 20 (preferably, the entire of container 20) (step S1), then an image of workpieces 18 is capture by means of camera 22 (step S2).

Figure 7:
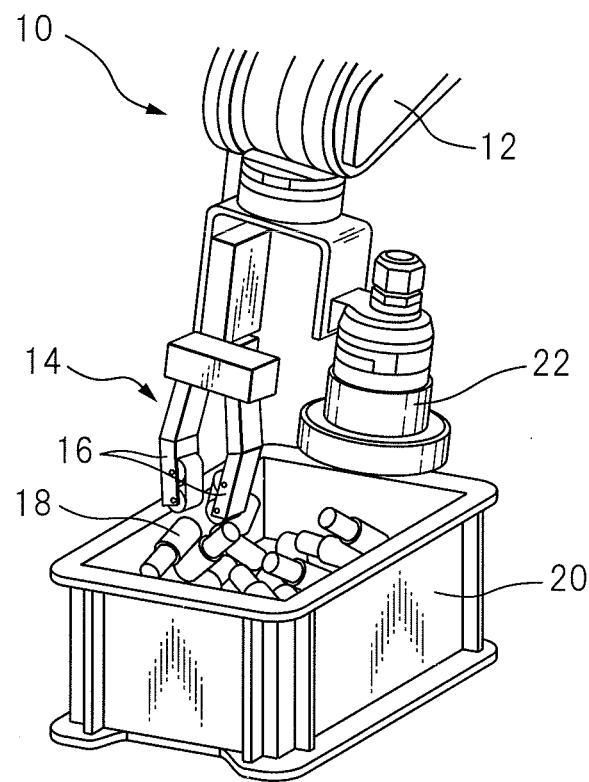
FIG. 7 is a view showing a state wherein a robot is moved to an approach start position.

In the next step S3, the image obtained by camera 22 is processed so as to detect an objective workpiece to be taken out by hand 14. The detail of a method for the detection is omitted, since such a method may be conventional. For example, a workpiece located at the highest position, among workpieces overlapping with each other, may be detected as the objective workpiece. After the objective is detected, robot 10 is moved to an approach starting position, as shown in FIG. 7 (step S4). Concretely, robot arm 12 is operated so that hand 14 approaches one workpiece 18 detected as the objective workpiece, the front end (or roller device 26 arranged at the front end) of finger 16 of hand 14 is positioned immediately above objective workpiece 18, and the orientation of hand 14 is properly corrected so as to take out workpiece 18.

In the next step S5, roller device 26 arranged at the front end of finger 16 is rotated in a workpiece-withdrawing direction (or the forward direction). In this regard, the "workpiece-withdrawing direction" means a moving direction of surfaces 50 of opposing belts 34 from the front end of finger 16 to base part 24 (the upward direction in FIG. 2). As described below, the objective workpiece gripped between the belt surfaces will be withdrawn between the fingers.

Figure 8A:
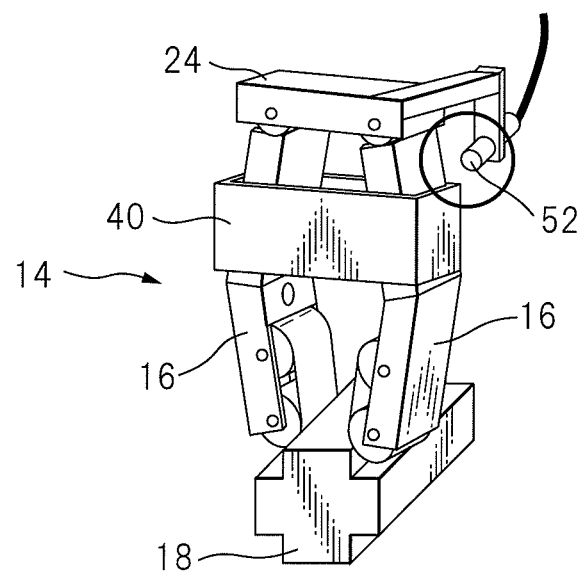
FIGS. 8A and 8B are views showing an example wherein the position of the frame member is detected by a photoelectric sensor.
Figure 8B:
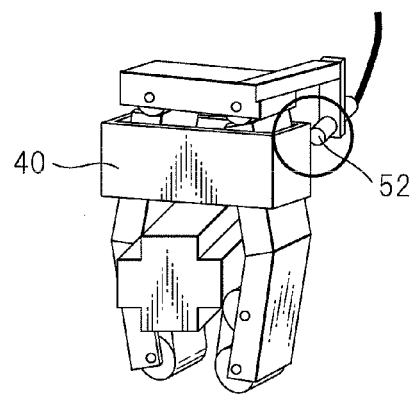

In the next step S6, the restriction of fingers 16 (or the gripping part) by the above restricting structure is released, and in the next step S7, it is judged as to whether fingers 16 are in a not-restricted state (or a released state). As a concrete means for this judgment, a photoelectric sensor 52 as shown in FIGS. 8A and 8B may be used. Photoelectric sensor 52 may be arranged at a portion (for example, base part 24) which is not moved with frame member 40, whereby it can be detected as to whether frame member 40 is positioned at a position where fingers 16 are restricted (FIG. 8A) or another position where fingers 16 are not restricted (FIG. 8B).

Figure 9:
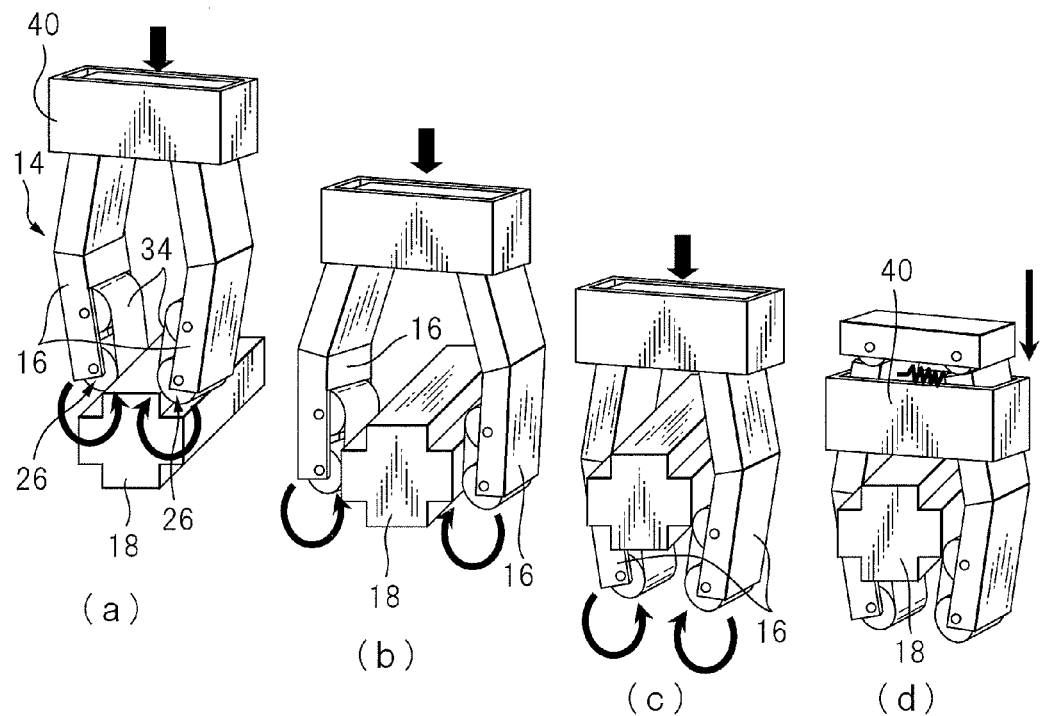
FIG. 9 is a view showing a process for withdrawing the workpiece into a gripping part.

After it is confirmed that the gripping part is in the release state, in the next step S8, hand 14 approaches (or moves toward) the objective workpiece so that roller device 26 at the front end of the finger comes into contact with the objective workpiece, as shown in FIG. 9(a). Then, since roller device 26 is rotated in the forward direction as indicated by an arrow, workpiece is withdrawn between opposing belts 34. As a result, as shown in FIG. 9(b), fingers 16 are opened so that workpiece 18 is further withdrawn into a gripping area between the fingers.

Figure 10A:
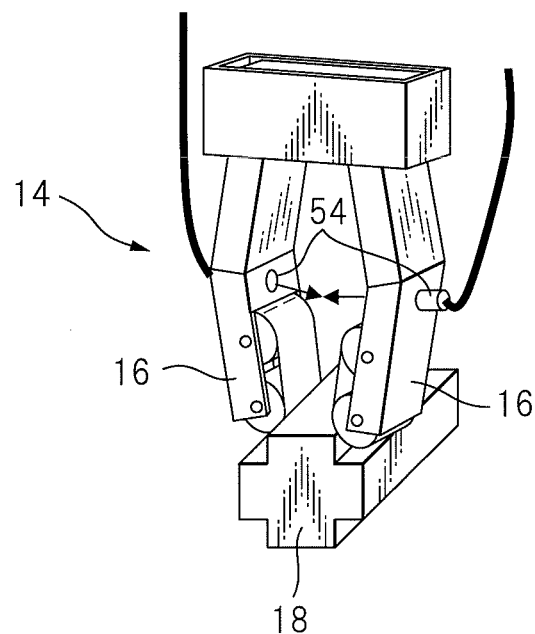
FIGS. 10A and 10B are views showing an example wherein the existence of the workpiece in the gripping part is directly sensed by a photoelectric sensor.
Figure 10B:
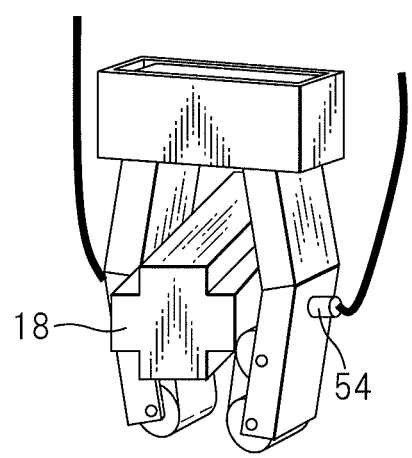

In the next step S9, it is judged as to whether workpiece 18 exists in the gripping part (concretely, workpiece 18 is gripped at a predetermined place in the gripping area between fingers 16, as shown in FIG. 9(c)). As a concrete means for this judgment, a sensing device for directly sensing the existence of the workpiece in the gripping area (concretely, a photoelectric sensor 54) may be used. For example, photoelectric sensor 54 has a light-emitting element and a light-receiving element which are positioned on respective inside surfaces of the two fingers, whereby is can be sensed as to whether an article (or the workpiece) exists between the elements (FIG. 10B) or not (FIG. 10A).

Figure 11A:
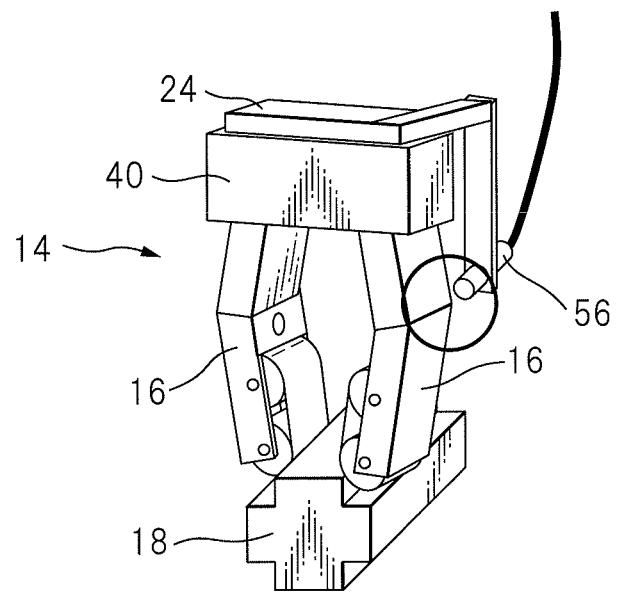
FIGS. 11A and 11B are views showing an example wherein the existence of the workpiece in the gripping part is indirectly sensed by a photoelectric sensor.
Figure 11B:
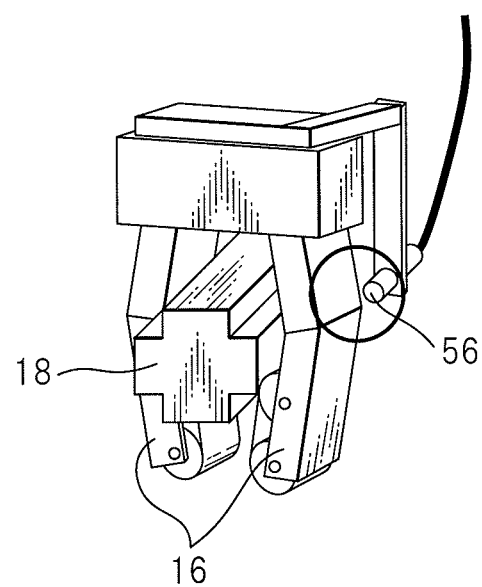

Alternatively, as shown in FIGS. 11A and 11B, a sensing device for indirectly sensing the existence of the workpiece in the gripping area by detecting an opening degree of the fingers (concretely, a photoelectric sensor 56) may be used. Photoelectric sensor 56 may be arranged at a portion (for example, base part 24) which is not moved with fingers 16, and is configured to detect as to whether the degree of opening of the gripping part (of the distance between the fingers) is equal to or less than a predetermined value (FIG. 11A) or not (FIG. 11B). In other words, when the degree of opening of the gripping part is equal to or less than the predetermined value (FIG. 11A), it can be judged that the workpiece does not exist between fingers 16 (or in the gripping area). On the other hand, when the degree of opening of the gripping part is larger than the predetermined value (FIG. 11B), it can be judged that the workpiece exists between fingers 16.

After it is confirmed that the workpiece exists in the gripping area in step S9, the gripping part is restricted by the restricting structure (step S10). Concretely, as shown in FIG. 9(d), frame member 40 is lowered so that the gripping part generates a predetermined gripping force. Next, in step S11, it is judged as to whether fingers 16 are in the restricted state. For this judgment, photoelectric sensor 52 as described above may be used. In other words, since frame member 40 cannot be lowered below a certain height when workpiece 18 is gripped between fingers 16 (as shown in FIG. 8B), by sensing this state, it can be judged that the gripping part is restricted while retaining the workpiece between the fingers.

In the next step S12, the robot is operated so that the gripped workpiece is conveyed a predetermined place. Then, the restriction of hand 14 is released (step S13), and it is judged as to whether fingers 16 are not restricted (or in the released state) (step S14). Concretely, from the state as shown in FIG. 12(a) (corresponding to FIG. 9(d)), frame member 40 is raised so as to release the restriction of fingers 16 (FIG. 12(b)). For this judgment, photoelectric sensor 52 as described above may also be used.

Figure 12:
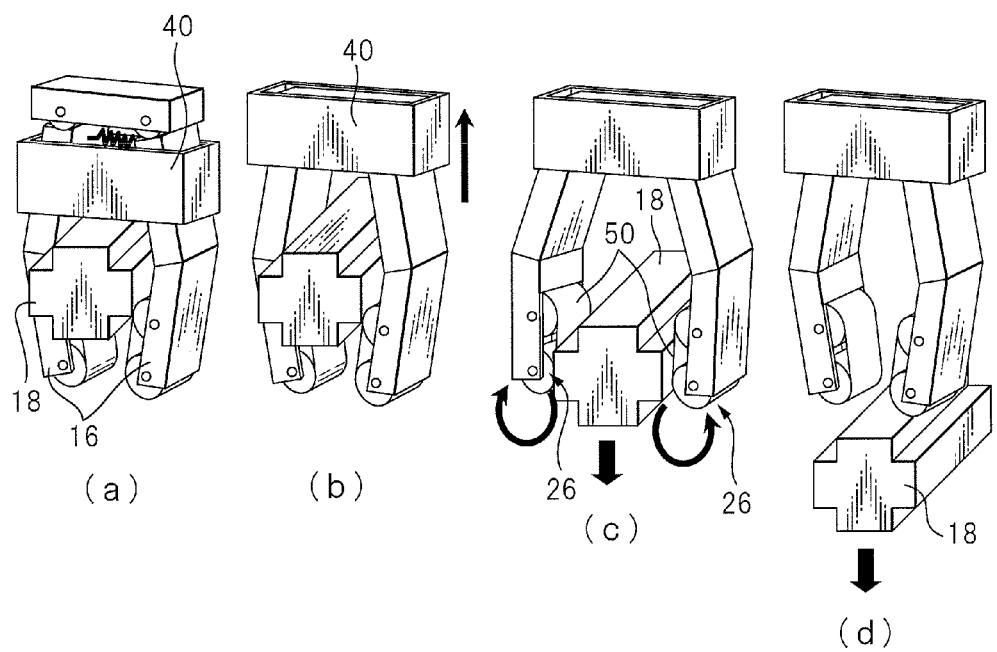
FIG. 12 is a view showing a process for releasing the workpiece from the gripping part.

Next, roller device 26 arranged at the front end of finger 16 is rotated in a workpiece-releasing direction (or the reverse direction) (step S15). In this regard, the "workpiece-releasing direction" means a moving direction of surfaces 50 of opposing belts 34 from base part 24 to the front end of finger 16 (the downward direction in FIG. 12). As shown in FIGS. 12(a) and (c), the workpiece gripped between the belt surfaces is released from the gripping part.

The gripped workpiece may be released by releasing the restriction of the restricting structure, instead of rotating roller device 26 in the reverse direction in step S15. For example, in the case of the hand having frame member 40 as shown in FIG. 4, the workpiece gripped between fingers 16 may be dropped due to the own weight thereof, only by raising frame member 40 (or moving frame member 40 toward base part 24). On the other hand, in the case of the hand having air cylinder 44 as shown in FIG. 5, the workpiece gripped between fingers 16 may be dropped due to the own weight thereof, only by retracting piston 48 into main body 46. Otherwise, when air cylinder 44 is used, the front end of piston 48 may be connected (for example, adhered) to finger 16, whereby fingers 16 are forcibly opened by retracting piston 48.

In the next step S16, it is judged as to whether workpiece 18 exists in the gripping part or not. For this judgment, photoelectric sensor 54 or 56 as described above may be used. After it is confirmed that workpiece 18 is released from hand 14 (i.e., workpiece 18 does not exist in the gripping part), the gripping part is restricted by the restricting structure (step S17). Then, after it is confirmed that the gripping part is in the restricted state by using photoelectric sensor 52, etc. (step S18), it can be considered that the gripping and conveying operation of one workpiece is completed. After that, steps S1 to S18 are repeated in order to grip and convey another workpiece.

By properly adjusting a spring constant of spring 42, spring 42 may also have the function as the restricting structure for the gripping part, whereby frame member 40 and air cylinder 44 as described above are not necessary. However, in such a case, it is necessary to select spring 42 having a spring constant, by which fingers 16 can be properly opened against the biasing force of the spring when the workpiece is to be withdrawn into the gripping area (from FIGS. 9(a) to 9(b)); fingers 16 generate a proper gripping force so that the workpiece does not drop during the workpiece is gripped (FIG. 9(c)); and fingers 16 can also be properly opened against the biasing force of the spring when the workpiece is to be released from the gripping area (from FIGS. 12(c) to 12(d)).

Figure 13:
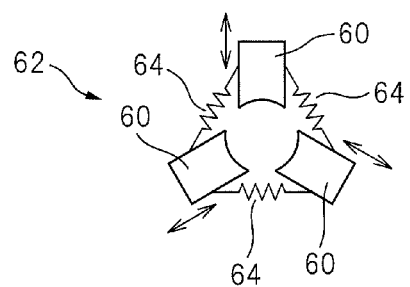
FIG. 13 is a view schematically showing that the hand has three fingers.

In the above embodiment, the two fingers constitute the gripping part for the workpiece. However, as schematically shown in FIG. 13, a three-jaw-type hand (or gripping part) 62 may be constituted by using three fingers 60. In this case, each of three fingers 60, disposed at 120 angular intervals, may be moved in the radial direction, and the above roller device is arranged at the front end of each finger. Although only one spring is necessary to connect each spring in the above embodiment, up to three springs 64 may be arranged when the number of fingers is three. Such a three-jaw type gripping part is available when the workpiece to be taken out has a sphere shape or some such shape. In addition, it would be obvious that air cylinder 44 or frame member 40 may be similarly applied to the gripping part having three fingers, when the shape of frame member 40 is properly modified.

According to the present invention, by contacting the roller device at the front end of the finger to the workpiece, the workpiece to be taken out can be purposely withdrawn into the hand, further, the workpiece is firmly gripped by means of the restricting structure. Therefore, failure frequency of gripping the workpiece from randomly located workpieces may be reduced, and work efficiency of the handling operation may be improved. Further, since the workpiece may be withdrawn and released due to the forward and reverse rotations of the roller device, respectively, it is not necessary to arrange an unclamp structure at the gripping part, whereby the hand may be simplified and the cost thereof may be reduced.

The position and posture of the hand can be properly corrected based on the image obtained by the vision sensor, whereby the randomly located workpieces can be properly taken out.

By using the sensing device for sensing that the workpiece is withdrawn into the gripping area, reliability of the taking out operation can be improved. Further, by indirectly sensing the workpiece by detecting the degree of opening of the fingers, the sensing can be carried out without depending on the shape of the workpiece.

By constituting the roller device as a rotating belt device, the contact area between the roller device and the objective workpiece can be increased, whereby the workpiece may be assuredly withdrawn. On the other hand, the roller device has a simple structure without using a belt, the cost thereof may be reduced and maintenance thereof can be easily carried out.

By using the biasing means which inwardly biases each finger so that the distance between the fingers becomes equal to or less than the predetermined value, when the fingers are in the release state, the free rotation of the roller device when taking out the workpiece can be avoided.

By using a low-cost spring as the biasing means, the cost of the system can be reduced.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A taking out robot system having a robot configured to take out a workpiece one-by-one by using a hand attached to a front end of a robot arm of the robot, wherein the hand comprises:
    a base part fixed to the front end of the robot arm;
    a gripping part constituted by two or three fingers pivotally attached to the base part, the gripping part being capable of gripping a workpiece to be taken out within a gripping area defined by the fingers;
    a roller device arranged at a front end of each finger, the roller device having a roller driven by a motor,
    wherein the each roller device is configured to grip the workpiece to be taken out between the opposing rollers and withdraw the gripped workpiece into the gripping area, due to forward rotation of the roller,
    wherein the hand further comprises a gripping part-restricting structure configured to gradually varying a distance between the two or three fingers so that a state of the gripping part can be switched between a restricted state in which the fingers are restricted so as to generate a predetermined gripping force and a released state in which the fingers are released from restriction;
    a vision sensor which detects a position and posture of each of a plurality of workpieces which are randomly located;
    a reference motion program which is previously taught in relation to a reference workpiece, the reference motion program including a robot motion command including a series of teaching points and a command for the hand, by which the reference workpiece is taken out by the hand; and
    a controller having a function for correcting positional information and postural information at each of the series of teaching points in the reference motion program, based on information from the vision sensor.

2. The taking out robot system as set forth in claim 1, wherein the gripping part-restricting part has a frame member through which all of the two or three fingers extend, the frame member being configured to slide along a direction from the base part to the roller device so as to gradually vary the distance between the two or three fingers.

3. The taking out robot system as set forth in claim 1, wherein the gripping part-restricting part has an air cylinder which is positioned on the base part adjacent to an outside of each finger, and each air cylinder is configured to contact the outside of the finger and apply pressure to the finger so as to gradually vary the distance between the two or three fingers.

4. The taking out robot system as set forth in claim 1, wherein the robot system comprises a sensing device which senses that the workpiece is withdrawn into the gripping area.

5. The taking out robot system as set forth in claim 4, wherein the sensing device is a photoelectric sensor which indirectly senses existence of the workpiece in the gripping area, by detecting an opening degree of the fingers.

6. The taking out robot system as set forth in claim 4, wherein the sensing device is a photoelectric sensor which directly senses existence of the workpiece in the gripping area.

7. The taking out robot system as set forth in claim 1, wherein the roller device is a rotating belt device including a motor, a driving roller which is rotatably driven by the motor, and a driven roller which is rotated with the driving roller via a belt.

8. The taking out robot system as set forth in claim 1, wherein the roller device includes a motor, and two driving rollers which are rotatably driven by the motor.

9. The taking out robot system as set forth in claim 1, wherein each of the roller devices is configured to rotate the roller in a reverse direction so that the workpiece gripped within the gripping area is released through a region between the opposing rollers.

10. The taking out robot system as set forth in claim 1, wherein the hand comprises biasing means which inwardly biases each finger so that a distance between the fingers is equal to or shorter than a predetermined value, when the two or three fingers are in the released state.

11. The taking out robot system as set forth in claim 10, wherein the biasing means is a spring which connects the fingers to each other.

* * * * *